US010910876B2

(12) United States Patent
    Toyoda

(10) Patent No.: US 10,910,876 B2
(45) Date of Patent: Feb. 2, 2021

(54) UNINTERRUPTIBLE POWER SUPPLY DEVICE

(71) Applicant: TOSHIBA MITSUBISHI-ELECTRIC INDUSTRIAL SYSTEMS CORPORATION, Chuo-ku (JP)

(72) Inventor: Masaru Toyoda, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 110 days.

(21) Appl. No.: 16/333,394

(22) PCT Filed: Sep. 30, 2016

(86) PCT No.: PCT/JP2016/079039
    § 371 (c)(1),
    (2) Date: Mar. 14, 2019

(87) PCT Pub. No.: WO2018/061184
    PCT Pub. Date: Apr. 5, 2018

(65) Prior Publication Data
    US 2020/0185960 A1    Jun. 11, 2020

(51) Int. Cl.
    *H02J 9/06*    (2006.01)
(52) U.S. Cl.
    CPC .................... *H02J 9/062* (2013.01)
(58) Field of Classification Search
    CPC ................ H02J 9/062; H02M 7/487
    See application file for complete search history.

(56) References Cited

U.S. PATENT DOCUMENTS

| 10,333,426 B2 * | 6/2019 | Correa Vasquez ...... H02M 1/36 |
| 2002/0141216 A1 * | 10/2002 | Ishihara .................... H02P 5/74 363/132 |

(Continued)

FOREIGN PATENT DOCUMENTS

| JP | 2004-023922 A | 1/2004 |
| JP | 2005-45856 A | 2/2005 |

(Continued)

OTHER PUBLICATIONS

International Search Report dated Nov. 15, 2016 in PCT/JP2016/079039 filed Sep. 30, 2016.

(Continued)

*Primary Examiner* — Jared Fureman
*Assistant Examiner* — Emmanuel Dominique
(74) *Attorney, Agent, or Firm* — Oblon, McClelland, Maier & Neustadt, L.L.P.

(57) ABSTRACT

A generation circuit is configured to generate an output voltage command value Vor* for an inverter based on a three-phase reference value Vr, a zero-phase reference value, a detected value of a current sensor, and a detected value of a voltage sensor. A compensation circuit is configured to compensate for a voltage drop in a three-phase AC line when three-phase AC power is supplied from the inverter to an AC load. A corrector is configured to correct the output voltage command value Vor* based on a compensation command value Vol. A control circuit is configured to control the inverter based on an output voltage command value Vo* corrected by the corrector.

16 Claims, 9 Drawing Sheets

(56) References Cited

U.S. PATENT DOCUMENTS

| | | | | |
|---|---|---|---|---|
| 2009/0322503 A1* | 12/2009 | Suzuki | ................. | B60W 20/40 |
| | | | | 340/438 |
| 2011/0211381 A1* | 9/2011 | Iwata | .................... | H02M 7/487 |
| | | | | 363/132 |
| 2013/0162049 A1* | 6/2013 | Morati | ...................... | H02J 3/16 |
| | | | | 307/82 |
| 2016/0268923 A1* | 9/2016 | Bremicker | .............. | H02J 3/383 |
| 2018/0191270 A1* | 7/2018 | Correa Vasquez | ..... | G01R 29/16 |

FOREIGN PATENT DOCUMENTS

| | | |
|---|---|---|
| JP | 2012-120407 A | 6/2012 |
| JP | 2015-220833 A | 12/2015 |

OTHER PUBLICATIONS

Indian Office Action dated Mar. 20, 2020 in Patent Application No. 201917016554 (with English translation), 6 pages.
Japanese Office Action dated Jun. 2, 2020 in Patent Application No. 2018-541835 (with English translation), 8 pages.
Office Action dated Sep. 8, 2020, in Japanese Patent Application No. 2018-541835, w/English-language Translation.

* cited by examiner

UNINTERRUPTIBLE POWER SUPPLY DEVICE

TECHNICAL FIELD

The present invention relates to an uninterruptible power supply device using a three-phase four-line power feeding method.

BACKGROUND ART

An uninterruptible power supply device using a three-phase four-line power feeding method can adopt a configuration in which power is supplied to a three-phase load using a three-phase power line, or a configuration in which power is supplied to each single-phase load using a one-phase power line of a three-phase power line and a neutral line.

On the other hand, in the configuration in which power is supplied to each single-phase load using a one-phase power line and a neutral line, imbalance may occur due to difference in the states of the single-phase loads for the respective phases. If imbalance occurs, a zero-phase voltage is superimposed on a three-phase alternating current (AC) voltage output from an inverter, and thus a stable sinusoidal voltage cannot be supplied to the loads.

To eliminate such imbalance, adjustment of an output voltage of an inverter is performed in an uninterruptible power supply device using a three-phase four-line power feeding method. For example, Japanese Patent Laying-Open No. 2012-120407 (PTL 1) discloses an uninterruptible power supply device including a zero-phase voltage control circuit configured to generate a zero-phase voltage command such that a zero-phase voltage becomes zero.

In PTL 1, the zero-phase voltage control circuit generates a zero-phase current command based on a deviation of the zero-phase voltage from the zero-phase voltage command. An output current control circuit generates an output current command for an inverter by adding the generated zero-phase current command to a three-phase current command, and generates an output voltage command for the inverter based on a deviation of a detected output current value from the output current command. Then, power conversion in the inverter is controlled according to the generated output voltage command.

CITATION LIST

Patent Literature

PTL 1: Japanese Patent Laying-Open No. 2012-120407

SUMMARY OF INVENTION

Technical Problem

Generally, an uninterruptible power supply device is connected with a load using a cable. The cable has an impedance which is proportional to its length. Accordingly, depending on the length of the cable, influence of a voltage drop due to the impedance may become too significant to ignore. In this case, since a voltage drops at a load end of the cable, it may become impossible to supply a stable voltage to the load.

As described above, in the three-phase four-line power feeding method, each single-phase load is connected between a power line for each phase and a neutral line. Accordingly, cables constituting the power lines for the respective phases may have different lengths. In this case, voltage drops having different magnitudes occur in the respective phases. As a result, voltages at load ends of the power lines for the respective phases become different from each other, and thus voltages to be supplied to the single-phase loads become non-uniform. Thereby, the uninterruptible power supply device cannot supply a stable voltage to the single-phase loads for the respective phases, resulting in decreased reliability.

The present invention has been made to solve the aforementioned problem, and an object thereof is to provide an uninterruptible power supply device using a three-phase four-line power feeding method, capable of supplying a uniform and stable voltage to loads for the respective phases.

Solution to Problem

An uninterruptible power supply device according to an aspect of the present invention includes a smoothing circuit, an inverter, a three-phase AC line, a neutral phase line, a current sensor, a voltage sensor, and a controller. The smoothing circuit includes two capacitors connected in series between a direct current (DC) positive bus and a DC negative bus. The inverter is connected to a DC terminal and a neutral point of the smoothing circuit to convert DC power from the smoothing circuit into three-phase AC power. The three-phase AC line connects the inverter and an AC load. The neutral phase line connects the neutral point of the smoothing circuit and a neutral point of the AC load. The current sensor detects an output current of each phase of the inverter. The voltage sensor detects an output voltage of each phase of the inverter. The controller is configured to control power conversion operation of the inverter. The controller includes a generation circuit, a compensation circuit, a corrector, and a control circuit. The generation circuit is configured to generate an output voltage command value for the inverter based on a three-phase reference value which is a target value of the output voltage of each phase of the inverter, a zero-phase reference value which is a target value of a zero-phase voltage of the inverter, a detected value of the current sensor, and a detected value of the voltage sensor. The compensation circuit is configured to generate a compensation command value for compensating for a voltage drop in the three-phase AC line when the three-phase AC power is supplied from the inverter to the AC load. The corrector is configured to correct the output voltage command value based on the compensation command value. The control circuit is configured to control the inverter based on the output voltage command value corrected by the corrector.

Advantageous Effects of Invention

According to the present invention, in the uninterruptible power supply device using the three-phase four-line power feeding method, a uniform and stable voltage can be supplied to loads for the respective phases.

DESCRIPTION OF EMBODIMENTS

Figure 1:
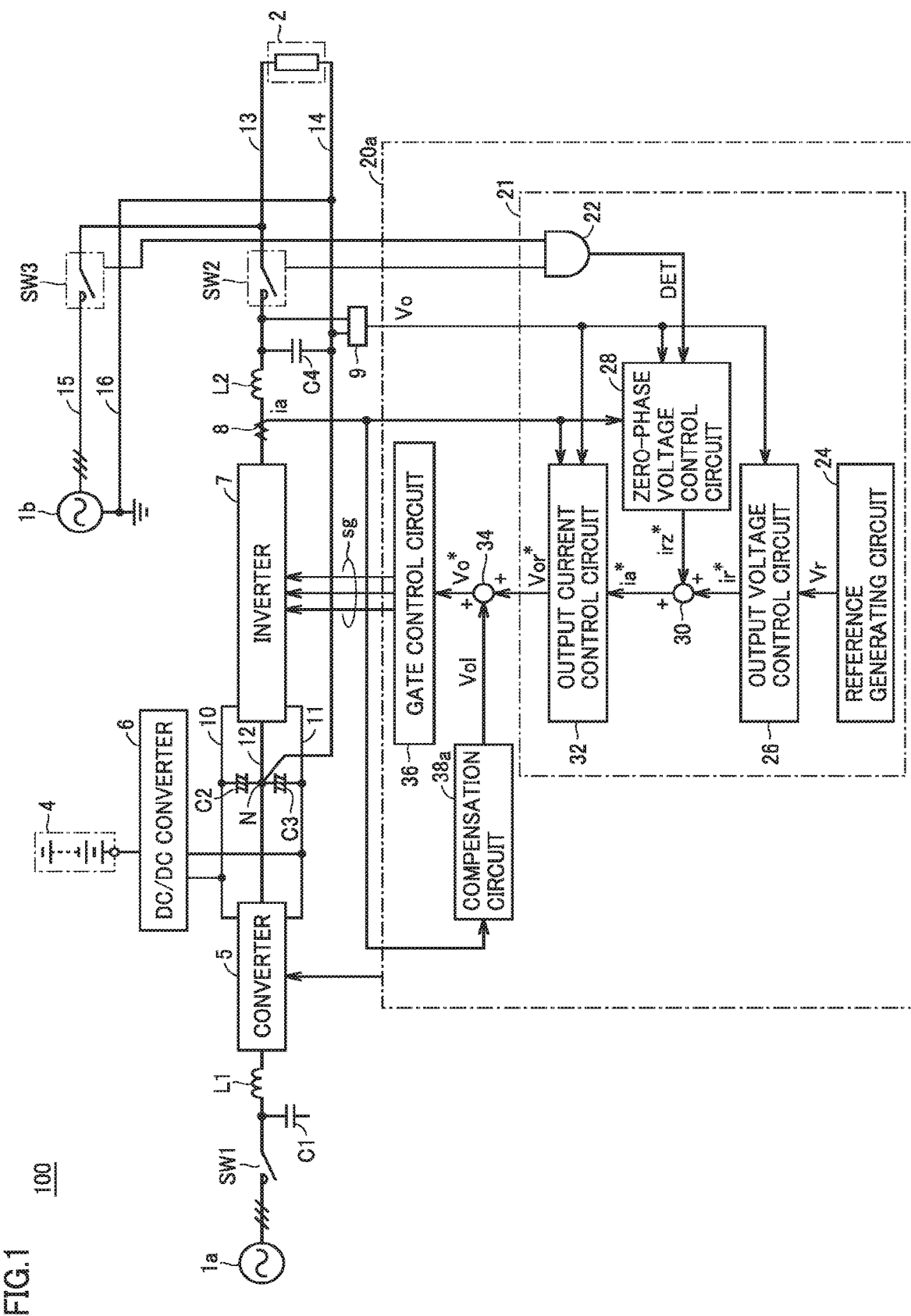
FIG. 1 is a schematic block diagram showing a main circuit configuration of an uninterruptible power supply device in accordance with a first embodiment of the present invention.

Hereinafter, embodiments of the present invention will be described in detail with reference to the drawings. It should be noted that identical or corresponding parts in the drawings will be designated by the same reference numerals, and the description thereof will not be repeated.

First Embodiment

FIG. 1 is a schematic block diagram showing a main circuit configuration of an uninterruptible power supply device 100 in accordance with a first embodiment of the present invention. The uninterruptible power supply device in accordance with the first embodiment of the present invention is a three-phase four-line non-insulated uninterruptible power supply device, and supplies AC power to an AC load 2.

In the configuration shown in FIG. 1, uninterruptible power supply device 100 includes capacitors C1 to C4, reactors L1 and L2, a converter 5, a storage battery 4, a DC/DC converter 6, an inverter 7, a three-phase AC line 13, a neutral phase line 14, a current sensor 8, a voltage sensor 9, and a controller 20a.

An AC power supply 1a is an AC power supply for externally supplying AC power to uninterruptible power supply device 100. AC power supply 1a is composed of a commercial AC power supply, a private power generator, or the like, for example. In FIG. 1 and the drawings described hereinafter, a three-phase three-line power supply is shown as an AC power supply. For simplification of the drawing and the description, only a circuit for one phase of the three phases is shown representatively in FIG. 1.

Three-phase AC power supplied from AC power supply 1a is supplied to converter 5 via a switch SW1 and an input filter composed of reactor L1 and capacitor C1.

Switch SW1 is an electromagnetic contactor, for example, and switches between conduction and non-conduction (ON and OFF) in response to a signal from controller 20a. Specifically, switch SW1 is turned ON in an ordinary state where the three-phase AC power is normally supplied from AC power supply 1a, and is turned OFF during maintenance of uninterruptible power supply device 100, for example.

The input filter is provided to allow the AC power from AC power supply 1a to pass therethrough, and prevent a signal having a switching frequency generated by converter 5 from propagating to AC power supply 1a.

Converter 5 is controlled by controller 20a. In the ordinary state, converter 5 converts the three-phase AC power supplied from AC power supply 1a into DC power. The DC power generated by converter 5 is supplied to between a DC positive bus 10 and a DC negative bus 11. In contrast, in a power failure state where supply of the three-phase AC power from AC power supply 1a is stopped, operation of converter 5 is stopped.

Capacitors C2 and C3 are connected in series between DC positive bus 10 and DC negative bus 11 to smooth a voltage between DC positive bus 10 and DC negative bus 11. That is, capacitors C2 and C3 constitute a "smoothing circuit". A DC neutral point bus 12 is connected to a neutral point N which is a connection point between capacitors C2 and C3. Neutral point N is further connected with a neutral point of AC load 2 via neutral phase line 14.

DC/DC converter 6 is connected between DC positive bus 10 and DC negative bus 11. DC/DC converter 6 is controlled by controller 20a. In the ordinary state, DC/DC converter 6 supplies the DC power generated by converter 5 to storage battery 4, and in the power failure state, DC/DC converter 6 supplies the DC power in storage battery 4 to inverter 7. In other words, in the ordinary state, DC/DC converter 6 bucks the DC power generated by converter 5 and supplies it to storage battery 4, and in the power failure state, DC/DC converter 6 boosts a voltage between terminals of storage battery 4 and supplies it to inverter 7.

Storage battery 4 is a power storage device for supplying DC power to inverter 7 in the power failure state. In the ordinary state, storage battery 4 stores the DC power generated by converter 5. It should be noted that, as a power storage device, an electric double layer capacitor or the like can be used instead of storage battery 4.

Inverter 7 is controlled by controller 20a, and converts the DC power supplied from the smoothing circuit via DC positive bus 10, DC neutral point bus 12, and DC negative bus 11 into three-phase AC power. Specifically, in the ordinary state, inverter 7 converts the DC power generated by converter 5 into three-phase AC power, and in the power failure state, inverter 7 converts the DC power supplied from storage battery 4 via DC/DC converter 6 into three-phase AC power. The three-phase AC power from inverter 7 is supplied to AC load 2 via an output filter composed of reactor L2 and capacitor C4, and three-phase AC line 13 (a U-phase line UL, a V-phase line VL, a W-phase line WL).

Current sensor 8 is provided to three-phase AC line 13 to detect a three-phase current ia (a current iau of the U-phase line, a current iav of the V-phase line, a current iaw of the W-phase line) output from inverter 7, and output a three-phase current signal indicating three-phase current ia to controller 20a. Voltage sensor 9 detects a voltage Vo of three-phase AC line 13 (a voltage Vou of the U-phase line, a voltage Vov of the V-phase line, a voltage Vow of the W-phase line), and outputs a three-phase voltage signal indicating three-phase voltage Vo to controller 20a.

A switch SW2 is provided to three-phase AC line 13. Switch SW2 switches between conduction and non-conduction of a power supply path from inverter 7 to AC load 2. Switch SW2 is a contactor, for example, and is turned ON/OFF in response to a signal from controller 20a. Specifically, switch SW2 is turned ON when power is supplied from inverter 7 to AC load 2, and is turned OFF when power supply from inverter 7 to AC load 2 is stopped. A signal indicating the state of conduction/non-conduction of switch SW2 is output to controller 20a.

A bypass AC power supply 1b is provided to supply AC power to AC load 2 during maintenance of converter 5 and inverter 7 and when a failure occurs in converter 5 and inverter 7, and is connected in parallel with uninterruptible power supply device 100. While bypass AC power supply 1b may be the same as or different from AC power supply 1a, it is assumed herein that bypass AC power supply 1b is the same as AC power supply 1a. Bypass AC power supply 1b is connected to a three-phase AC line 15, and three-phase AC line 15 is connected to three-phase AC line 13. Further, a neutral point of bypass AC power supply 1b is grounded, and is connected to neutral phase line 14 via a ground line 16.

A switch SW3 is provided to three-phase AC line 15. The neutral point of AC load 2 is connected to neutral phase line 14.

Switch SW3 switches between conduction and non-conduction of a power supply path from bypass AC power supply 1b to AC load 2. Switch SW3 is turned ON/OFF in response to a signal from controller 20a. Specifically, for example, switch SW3 is composed of a parallel circuit of a thyristor switch and a contactor. Switch SW3 is turned OFF when power is supplied from inverter 7 to AC load 2, and is turned ON when power is supplied from bypass AC power supply 1b to AC load 2. A signal indicating the state of conduction/non-conduction of switch SW3 is output to controller 20a.

Controller 20a controls power conversion operation of converter 5 and inverter 7. Although described later in detail, inverter 7 is composed of a semiconductor switching element. In the present embodiment, as a semiconductor switching element, for example, an IGBT (Insulated Gate Bipolar Transistor) is applied. Further, in the present embodiment, as a method for controlling the semiconductor switching element, PWM (Pulse Width Modulation) control is applicable. Controller 20a performs PWM control in response to the three-phase current signal from current sensor 8, the three-phase voltage signal from voltage sensor 9, and the signals indicating the states of conduction/non-conduction from switches SW2 and SW3.

Next, operation of uninterruptible power supply device 100 in accordance with the present embodiment will be described.

In the ordinary state where the three-phase AC power is normally supplied from AC power supply 1a, switch SW1 and switch SW2 are turned ON, and switch SW3 is turned OFF. Thereby, the three-phase AC power from AC power supply 1a is supplied to AC load 2 via converter 5 and inverter 7, and is stored in storage battery 4 via converter 5 and DC/DC converter 6 as DC power.

In contrast, in the power failure state where supply of the three-phase AC power from AC power supply 1a is stopped, power supply to AC load 2 is continued by operating DC/DC converter 6 and inverter 7 to convert the DC power from storage battery 4 into three-phase AC power.

In addition, during maintenance of converter 5 and inverter 7 and when a failure occurs in converter 5 and inverter 7, switch SW2 is turned OFF and switch SW3 is turned ON, and thereby the inverter and the like are separated from AC load 2 and the AC power from bypass AC power supply 1b is supplied to AC load 2.

Here, when power feeding from inverter 7 is switched to power feeding from bypass AC power supply 1b, the switches are controlled such that switch SW3 is turned ON with switch SW2 remaining in an ON state, and thereafter switch SW2 is turn OFF. Similarly, when power feeding from bypass AC power supply 1b is switched to power feeding from inverter 7, the switches are controlled such that switch SW2 is turned ON with switch SW3 remaining in an ON state, and thereafter switch SW3 is turn OFF. By providing a lap period that is a period for which both switch SW2 and switch SW3 are turned ON in this manner when switching ON/OFF of switches SW2 and SW3, switching between bypass AC power supply 1b and inverter 7 can be performed without any instantaneous interruption.

(Configuration of Controller) Controller 20a includes a generation circuit 21, a compensation circuit 38a, an adder 34, and a gate control circuit 36.

Generation circuit 21 includes an OR circuit 22, a reference generating circuit 24, an output voltage control circuit 26, a zero-phase voltage control circuit 28, an adder 30, and an output current control circuit 32.

OR circuit 22 receives the signals indicating the states of ON/OFF from switches SW2 and SW3, and detects whether or not uninterruptible power supply device 100 is at the period for which both switch SW2 and switch SW3 are turned ON (lap period) as a lap period detection signal DET. Lap period detection signal DET is output to zero-phase voltage control circuit 28 as described later.

Reference generating circuit 24 generates a three-phase reference value Vr (a U-phase reference value Vru, a V-phase reference value Vrv, a W-phase reference value Vrw) which is an amplitude reference value of three-phase voltage Vo (U-phase voltage Vou, V-phase voltage Vov, W-phase voltage Vow). U-phase reference value Vru, V-phase reference value Vrv, and W-phase reference value Vrw are sinusoidal voltages having a constant amplitude, for example. Reference generating circuit 24 is an oscillator, for example.

Output voltage control circuit 26 calculates a three-phase current command value ir* which is a reference value of the three-phase current, based on a deviation between three-phase reference value Vr and three-phase voltage Vo detected by voltage sensor 9.

Zero-phase voltage control circuit 28 generates a zero-phase reference value Vrz which is a reference value of a zero-phase voltage, and extracts a zero-phase voltage Voz from three-phase voltage Vo detected by voltage sensor 9. Then, zero-phase voltage control circuit 28 generates a zero-phase current command value irz* based on a deviation between zero-phase reference value Vrz and zero-phase voltage Voz. Details of zero-phase voltage control circuit 28 will be described later.

Three-phase current command value ir* from output voltage control circuit 26 and zero-phase current command value irz* from zero-phase voltage control circuit 28 are input to adder 30. Adder 30 adds three-phase current command value ir* and zero-phase current command value irz*, and outputs the added result to output current control circuit 32 as an output current command value ia* (a U-phase current command value iau*, a V-phase current command value iav*, a W-phase current command value iaw*).

Output current control circuit 32 receives output current command value ia* from adder 30, three-phase voltage Vo detected by voltage sensor 9, and three-phase current ia detected by current sensor 8. Based on these inputs, output current control circuit 32 generates an output voltage command value Vor* (a U-phase voltage command value Voru*, a V-phase voltage command value Vorv*, a W-phase voltage command value Vorw*).

Here, output voltage command value Vor* is adjusted such that the zero-phase voltage of U-phase voltage Vou, V-phase voltage Vov, and W-phase voltage Vow to be output from inverter 7 to three-phase AC line 13 becomes zero.

That is, when inverter 7 is controlled according to output voltage command value Vor*, amplitudes of U-phase voltage Vou, V-phase voltage Vov, and W-phase voltage Vow to be output from inverter 7 to three-phase AC line 13 become equal to those of U-phase reference value Vru, V-phase reference value Vrv, and W-phase reference value Vrw, respectively. That is, U-phase voltage Vou, V-phase voltage Vov, and W-phase voltage Vow are balanced.

(Configuration of Inverter)

Figure 2:
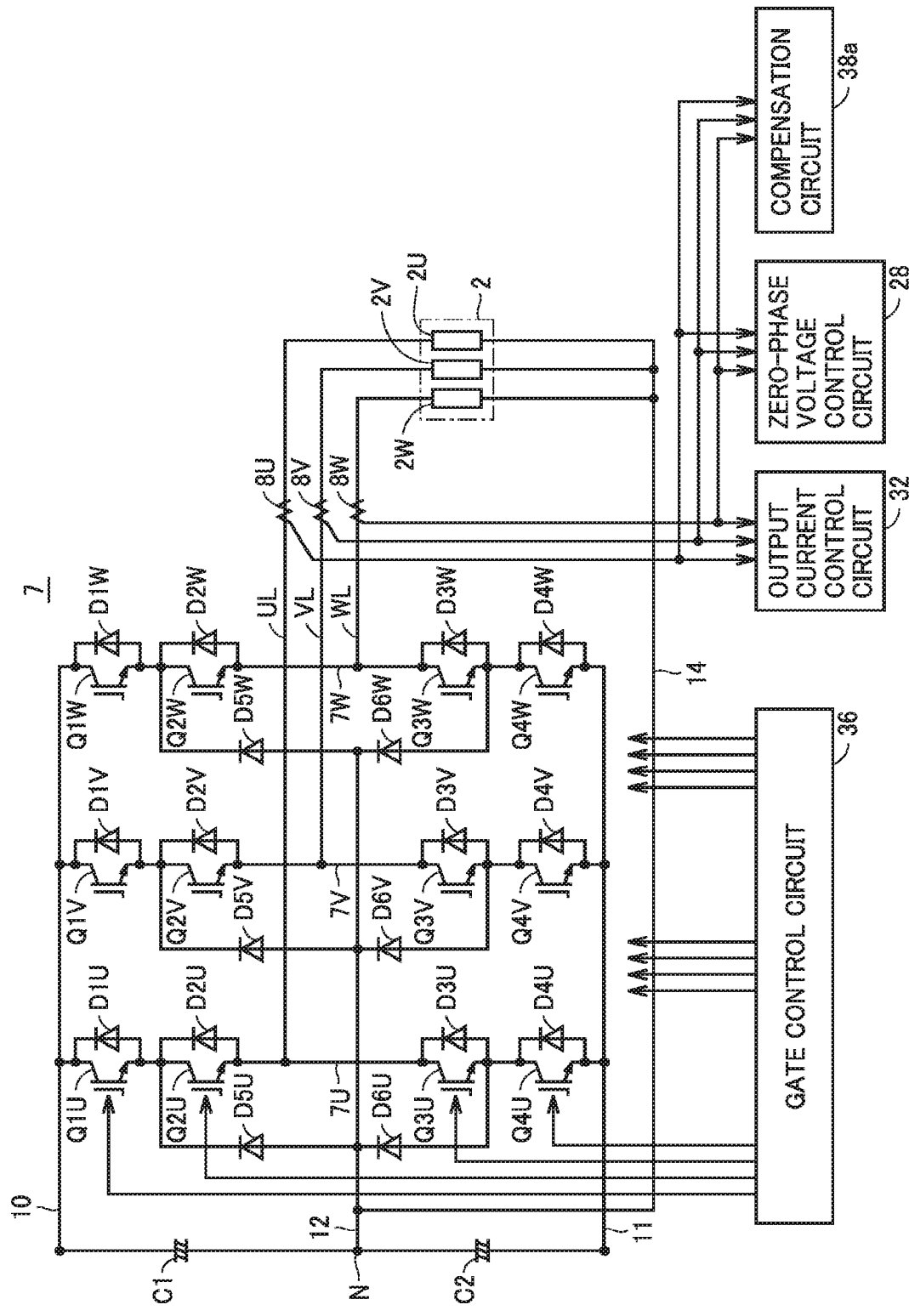
FIG. 2 is a circuit diagram illustrating configurations of an inverter and an AC load shown in FIG. 1 in detail.

FIG. 2 is a diagram illustrating configurations of inverter 7 and AC load 2 shown in FIG. 1 in detail.

Referring to FIG. 2, inverter 7 includes arms 7U, 7V, and 7 W, each of which is composed as a three-level circuit and includes four IGBT elements and six diodes.

Specifically, U-phase arm 7U includes IGBT elements Q1U to Q4U and diodes D1U to D6U. V-phase arm 7V includes IGBT elements Q1V to Q4V and diodes D1V to D6V. W-phase arm 7W includes IGBT elements Q1W to Q4W and diodes D1W to D6W.

In the following, letters U, V, and W will be collectively indicated by a letter "x" to collectively describe the respective phase arms of inverter 7. IGBT elements Q1$x$ to Q4$x$ are connected in series between DC positive bus 10 and DC negative bus 11. Diodes D1$x$ to D4$x$ are connected in antiparallel with IGBT elements Q1$x$ to Q4$x$, respectively. Diode D5$x$ has a cathode connected to a connection point between IGBT elements Q1$x$ and Q2$x$, and an anode connected to neutral point N. Diode D6$x$ has an anode connected to a connection point between IGBT elements Q3$x$ and Q4$x$, and a cathode connected to neutral point N. Diodes D1$x$ to D4$x$ function as reflux diodes, and diode D5$x$ and D6$x$ function as clamp diodes.

In each phase arm 7$x$ (7U, 7V, 7W) of inverter 7, a connection point between diodes D5$x$ and D6$x$ corresponds to a DC input terminal, and a connection point between IGBT elements Q2$x$ and Q3$x$ corresponds to an AC output terminal. The DC input terminal of each phase arm 7$x$ of inverter 7 is connected to neutral point N. Further, the AC output terminal of each phase arm 7$x$ of inverter 7 is connected to each corresponding phase line $x$L (U-phase line UL, V-phase line VL, W-phase line WL) of three-phase AC line 13.

Each of IGBT elements Q1$x$ to Q4$x$ is turned ON/OFF in response to a gate signal sg provided from gate control circuit 36. When a gate drive circuit (not shown) within inverter 7 receives gate signal sg output from gate control circuit 36, the gate drive circuit generates a signal for turning ON/OFF each of IGBT elements Q1$x$ to Q4$x$ based on gate signal sg, and outputs the generated signal to a corresponding IGBT element.

A single-phase load 2$x$ is connected between each phase line $x$L and neutral phase line 14.

A current sensor 8$x$ is provided to each phase line $x$L to detect each phase current i$ax$ output from inverter 7, and output each phase current signal indicating each phase current i$ax$ to output current control circuit 32, zero-phase voltage control circuit 28, and compensation circuit 38$a$ within controller 20$a$.

(Configuration of Zero-Phase Voltage Control Circuit)

Figure 3:
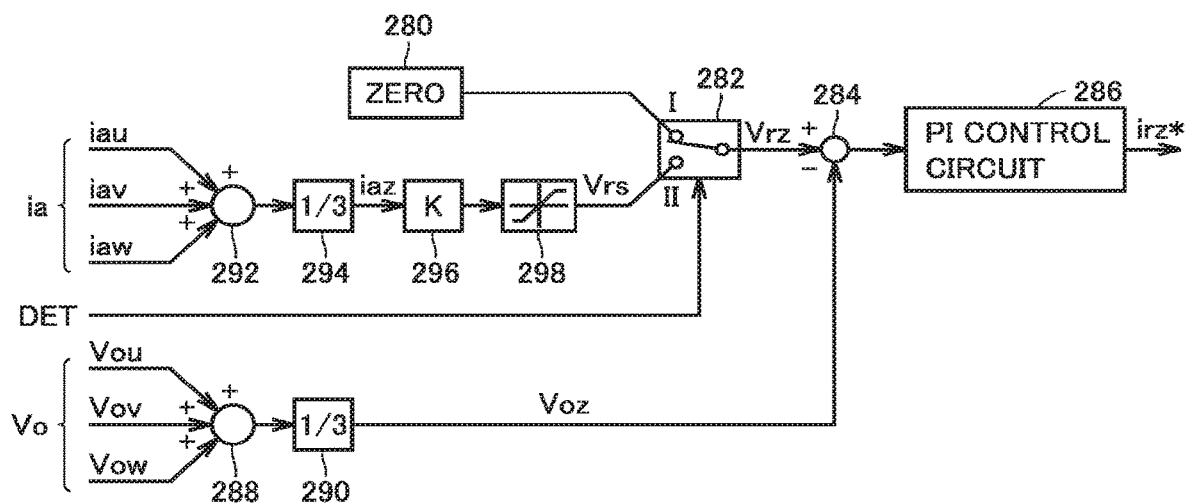
FIG. 3 is a functional block diagram of a zero-phase voltage control circuit shown in FIG. 1.

FIG. 3 is a functional block diagram of zero-phase voltage control circuit 28 shown in FIG. 1.

Referring to FIG. 3, zero-phase voltage control circuit 28 generates zero-phase current command value irz* based on a zero voltage generated by a zero voltage generator 280, three-phase voltage Vo detected by voltage sensor 9, and three-phase current ia detected by current sensor 8.

Zero-phase voltage control circuit 28 includes zero voltage generator 280, adders 288 and 292, multipliers 290, 294, and 296, a limiter 298, a switching circuit 282, and a subtracter 284.

Zero voltage generator 280, adder 292, multipliers 294 and 296, limiter 298, and switching circuit 282 constitute a reference generating circuit for generating zero-phase reference value Vrz based on the zero voltage and three-phase current ia. Adder 288 and multiplier 290 constitute a zero-phase voltage generation circuit for generating zero-phase voltage Voz based on three-phase voltage Vo.

First, a configuration of the reference generating circuit for generating zero-phase reference value Vrz will be described.

Zero voltage generator 280 generates the zero voltage, and outputs it to switching circuit 282.

Adder 292 adds U-phase current iau, V-phase current iav, and W-phase current iaw of three-phase current ia detected by current sensor 8, and outputs the added result to multiplier 294. Multiplier 294 calculates a zero-phase current iaz by multiplying the added result from adder 292 by ⅓ (iaz=⅓(iau+iav+iaw)).

Multiplier 296 multiples zero-phase current iaz from multiplier 294 by k (k is a constant which is more than or equal to 0 and less than or equal to 1), and outputs the result to limiter 298. Limiter 298 limits an output value of multiplier 296 so as not to exceed a predetermined range, and outputs it to switching circuit 282.

It should be noted that the reason for adopting a configuration of limiting a zero-phase reference value Vrs in this manner is that, for example when current sensor 8 has a large sensor error, it becomes rather impossible to perform normal control by generating the zero-phase reference value according to three-phase current ia detected by current sensor 8.

Switching circuit 282 is configured such that it can switch between terminals on an input side, i.e., one terminal on a side I to be connected to zero voltage generator 280, and the other terminal on a side II to be connected to limiter 298, in response to lap period detection signal DET from OR circuit 22 (FIG. 1). A terminal on an output side of switching circuit 282 is connected to subtracter 284. That is, when switching circuit 282 establishes connection with the terminal on side I, zero voltage generator 280 and subtracter 284 are connected. In contrast, when switching circuit 282 establishes connection with the terminal on side 11, limiter 298 and subtracter 284 are connected.

Controlling whether switching circuit 282 should establish connection with the terminal on side I or the terminal on side II is performed in response to lap period detection signal DET output from OR circuit 22. Here, lap period detection signal DET is a signal generated by OR circuit 22 and indicating whether or not uninterruptible power supply device 100 is at the period for which both switch SW2 and switch SW3 connected to OR circuit 22 are turned ON. Here, a state where both switch SW2 and switch SW3 are turned ON refers to a state where both the path in charge of power feeding from inverter 7 and the path in charge of power feeding from bypass AC power supply 1$b$ establish conduction with AC load 2. That is, lap period detection signal DET is a signal indicating whether or not uninterruptible power supply device 100 is at the lap period when switching between power feeding from inverter 7 and power feeding from bypass AC power supply 1$b$ is performed.

Specifically, when uninterruptible power supply device 100 is not at the lap period, OR circuit 22 outputs lap period detection signal DET having an L level. When switching circuit 282 receives lap period detection signal DET having an L level, switching circuit 282 establishes connection with the terminal on side I. Thereby, at a period other than the lap period, the zero voltage from zero voltage generator 280 is output to subtracter 284 as zero-phase reference value Vrz.

In contrast, when uninterruptible power supply device 100 is at the lap period, OR circuit 22 outputs lap period detection signal DET having an H level. When switching circuit 282 receives lap period detection signal DET having an H level, switching circuit 282 establishes connection with the terminal on side II. Thereby, at the lap period, zero-phase reference value Vrs from limiter 298 is output to subtracter 284 as zero-phase reference value Vrz.

On the other hand, in the zero-phase voltage generation circuit, adder 288 adds U-phase voltage Vou, V-phase voltage Vov, and W-phase voltage Vow of three-phase voltage Vo detected by voltage sensor 9, and outputs the added result to multiplier 290. Multiplier 290 calculates zero-phase voltage Voz by multiplying the added result from adder 288 by ⅓ (Voz=⅓(Vou+Vov+Vow)).

Subtracter 284 calculates a deviation between zero-phase reference value Vrz from the reference generating circuit and zero-phase voltage Voz from the zero-phase voltage generation circuit. A PI control circuit 286 generates zero-phase current command value irz* by performing a proportional integral computation using the deviation between zero-phase reference value Vrz and zero-phase voltage Voz as an input.

Based on zero-phase current command value irz* from zero-phase voltage control circuit 28, output current control circuit 32 adjusts output voltage command value Vor* such that the zero-phase voltage of U-phase voltage Vou, V-phase voltage Vov, and W-phase voltage Vow to be output from inverter 7 to three-phase AC line 13 becomes zero. That is, the amplitudes of U-phase voltage Vou, V-phase voltage Vov, and W-phase voltage Vow to be output from inverter 7 to three-phase AC line 13 become equal to those of U-phase reference value Vru, V-phase reference value Vrv, and W-phase reference value Vrw, respectively. That is, U-phase voltage Vou, V-phase voltage Vov, and W-phase voltage Vow are balanced.

As described in PTL 1, a conventional uninterruptible power supply device includes a zero-phase voltage control circuit configured to generate a zero-phase voltage command such that a zero-phase voltage becomes zero. However, even though the zero-phase voltage is controlled to become zero and the voltages to be output from inverter 7 to the respective phase lines are adjusted and balanced, when cables constituting the respective phase lines have different impedances, the respective phase lines have different voltage drop amounts, and thus voltages to be supplied to single-phase loads 2U, 2V, and 2W become unbalanced. As a result, it becomes difficult to supply a stable voltage to single-phase loads 2U, 2V, and 2W.

Accordingly, in the present embodiment, voltage drops in the respective phase lines are compensated for by compensation circuit 38a. Thereby, the voltages to be supplied to single-phase loads 2U, 2V, and 2W are balanced.

(Configuration for Compensation of Voltage Drops Due to Impedances of Cables)

Figure 4:
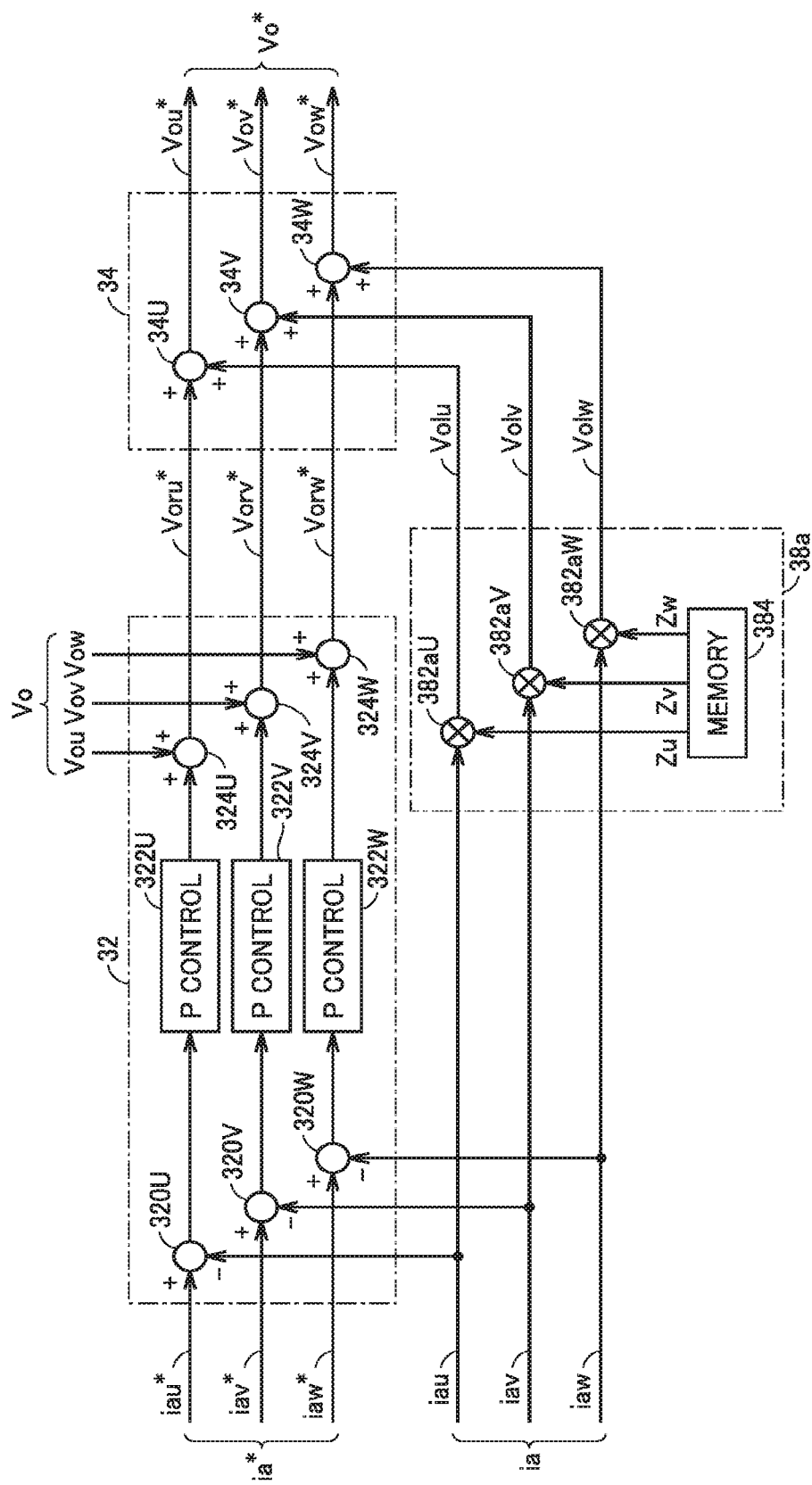
FIG. 4 is a functional block diagram of an output current control circuit, an adder, and a compensation circuit shown in FIG. 1.

FIG. 4 is a functional block diagram of output current control circuit 32, compensation circuit 38a, and adder 34 shown in FIG. 1.

Referring to FIG. 4, output current control circuit 32 includes subtracters 320U, 320V, and 320W, P control circuits 322U, 322V, and 322W, and adders 324U, 324V, and 324W. Adder 34 includes an adder 34U, an adder 34V, and an adder 34W.

Compensation circuit 38a includes a multiplier 382aU, a multiplier 382aV, a multiplier 382aW, and a memory 384. In the following, letters U, V, and W will be collectively indicated by a letter "x" to collectively describe compensation of voltage drops in the respective lines.

In output current control circuit 32, subtracter 320x calculates a deviation between x-phase current command value iax* and x-phase current iax detected by current sensor 8.

P control circuit 322x is configured to include a proportional element (P), performs a proportional computation using the deviation between x-phase current command value iax* and x-phase current iax as an input, and outputs the computed result to adder 324x.

Adder 324x adds the output of P control circuit 322x and voltage Vox detected by voltage sensor 9, and outputs the added result to adder 34x as output voltage command value Vorx*.

In compensation circuit 38a, memory 384 is configured to store beforehand impedances Zu, Zv, and Zw of the respective lines of three-phase AC line 13. Zu is the impedance of U-phase line UL, Zv is the impedance of V-phase line VL, and Zw is the impedance of W-phase line WL.

When multiplier 382ax reads impedance Zx of each line from memory 384, multiplier 382ax computes a compensation command value Volx by multiplying impedance Zx by each phase current iax detected by current sensor 8x (Volx=iax×Zx). Multiplier 382ax outputs compensation command value Volx to adder 34x.

Here, impedance Zx of each line of three-phase AC line 13 is determined by a wiring distance thereof, that is, a distance from the AC output terminal in uninterruptible power supply device 100 to single-phase load 2x. Accordingly, after uninterruptible power supply device 100 is installed and three-phase AC line 13 is provided between uninterruptible power supply device 100 and AC load 2, impedance Zx of each line has a fixed value. Therefore, voltage drop Volx generated in each line by current iax is proportional to current iax only. Thus, compensation circuit 38a can easily generate a compensation command value Vol based on the three-phase current signal from current sensor 8.

Adder 34x implements a corrector configured to correct output voltage command value Vorx* from adder 324x based on compensation command value Volx from compensation circuit 38a. Adder 34x in the present embodiment corrects output voltage command value Vorx* by adding compensation command value Volx from compensation circuit 38a to output voltage command value Vorx*. A corrected output voltage command value Vox* is output to gate control circuit 36.

Gate control circuit 36 generates gate signal sg (a U-phase gate signal sgu, a V-phase gate signal sgv, a W-phase gate signal sgw) by comparing corrected output voltage command value Vox* with a carrier wave signal. In inverter 7, ON/OFF of the four IGBT elements of each phase arm is controlled according to generated gate signal sg.

Thereby, three-phase voltage Vo for which voltage drops in the respective lines have been compensated for is output from inverter 7. U-phase voltage Vou, V-phase voltage Vov, and W-phase voltage Vow output from inverter 7 are unbalanced because voltage drops are taken into consideration. However, each of AC voltages to be supplied to single-phase loads 2U, 2V, and 2W via three-phase AC line 13 has a magnitude equal to that of three-phase reference value Vr of reference generating circuit 24.

As described above, according to the first embodiment of the present invention, in the uninterruptible power supply device using the three-phase four-line power feeding method, voltage drops in the respective lines of the three-phase AC line are compensated for. Therefore, a uniform and stable voltage can be supplied to the loads connected to the respective lines.

Second Embodiment

In a second embodiment, impedance Zx of each line of the three-phase AC line can be set arbitrarily by providing an impedance setter 39 connected to compensation circuit 38a.

Figure 5:
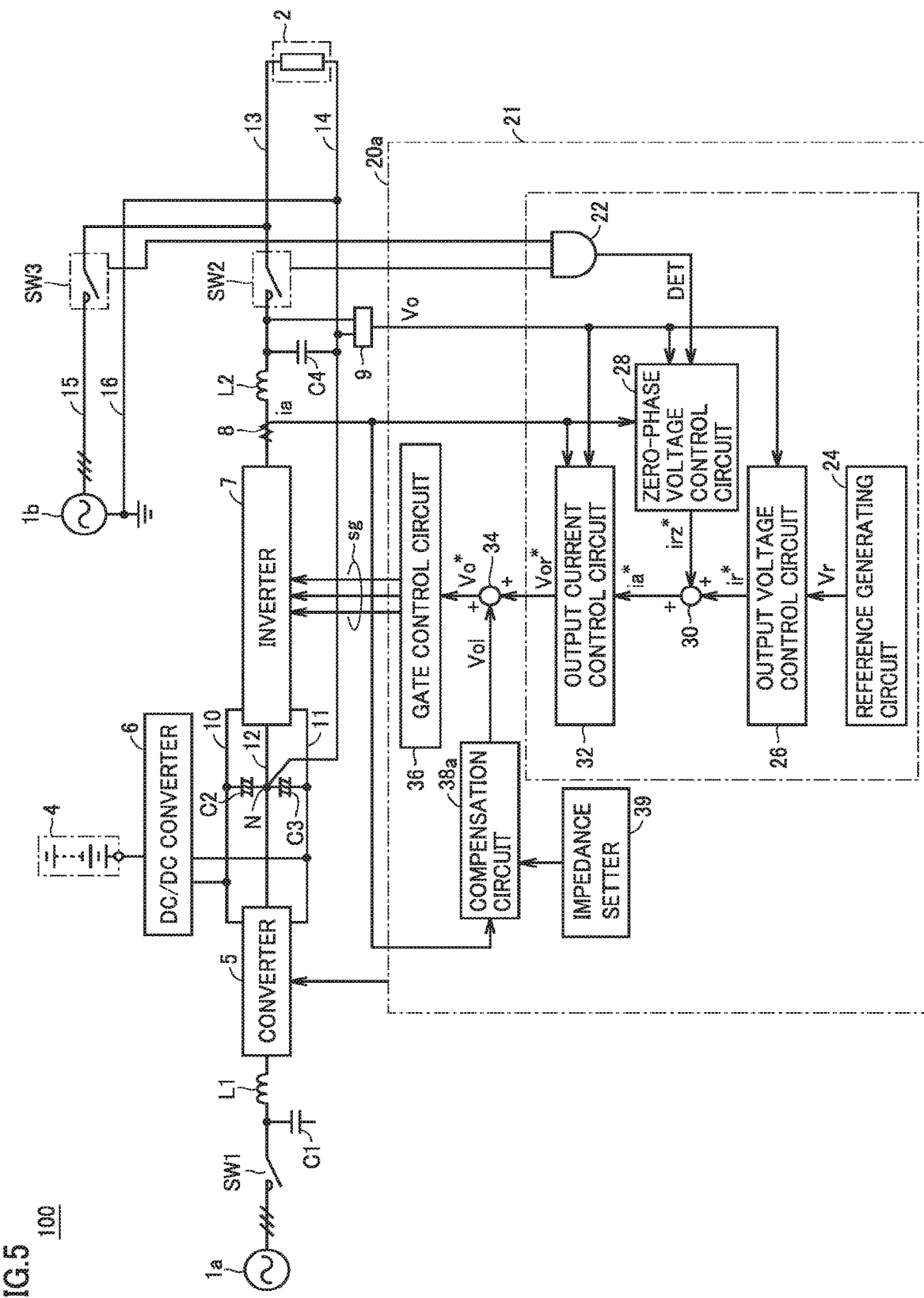
FIG. 5 is a schematic block diagram showing a main circuit configuration of an uninterruptible power supply device in accordance with a second embodiment of the present invention.

FIG. 5 is a schematic block diagram showing a main circuit configuration of uninterruptible power supply device 100 in accordance with the second embodiment of the present invention, and is a diagram to be compared with FIG. 1. Referring to FIG. 5, uninterruptible power supply device 100 in accordance with the second embodiment is different from uninterruptible power supply device 100 in FIG. 1 in that impedance setter 39 is added thereto. Impedance setter 39 is connected to compensation circuit 38a.

Figure 6:
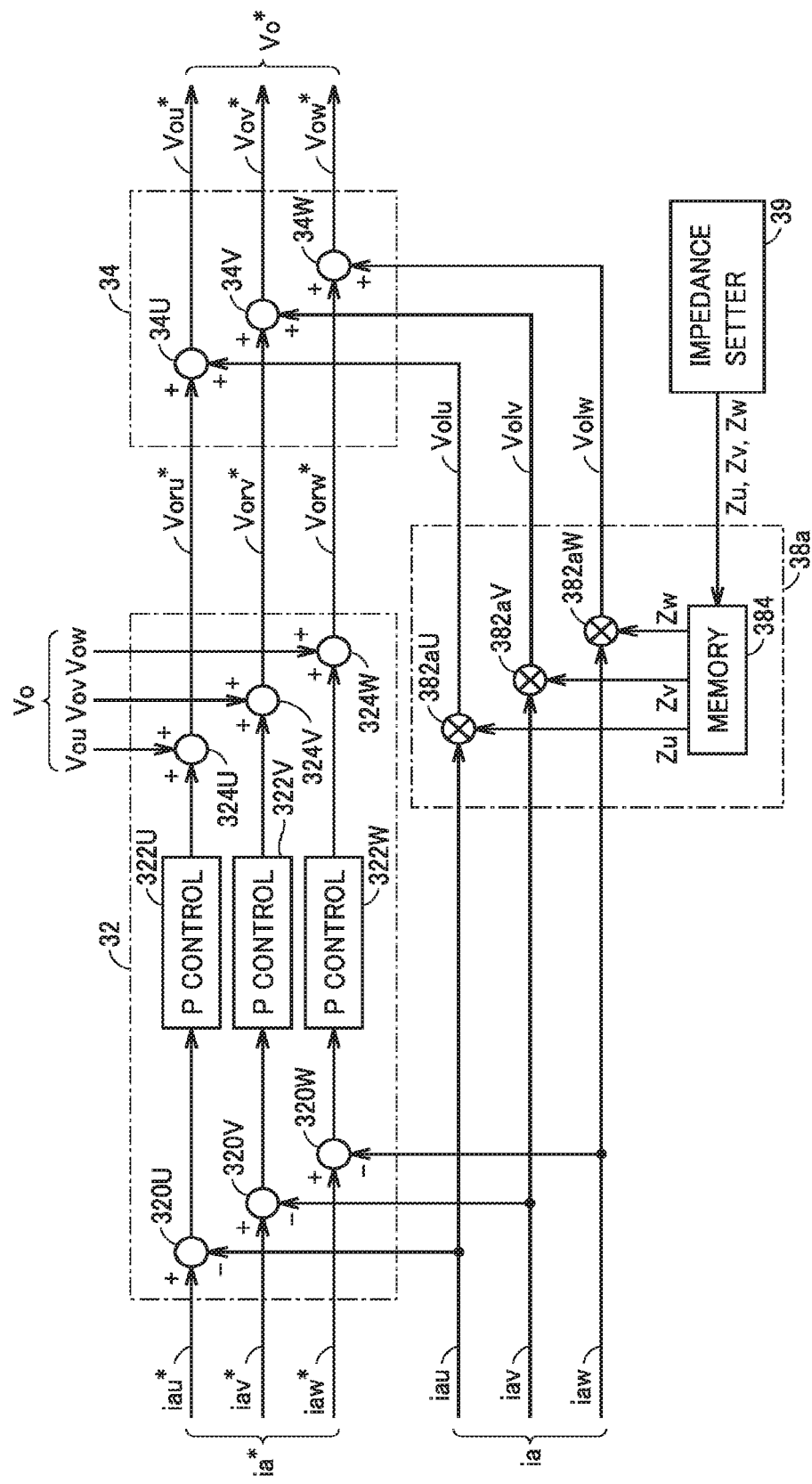
FIG. 6 is a functional block diagram of an output current control circuit, an adder, a compensation circuit, and an impedance setter shown in FIG. 5.

FIG. 6 is a functional block diagram of output current control circuit 32, adder 34, compensation circuit 38a, and impedance setter 39 shown in FIG. 5, and is a diagram to be compared with FIG. 4. Referring to FIG. 6, impedance setter 39 is configured such that it can arbitrarily set impedance Zx of each line of three-phase AC line 13. By setting impedance Zx using impedance setter 39, impedance Zx stored beforehand in memory 384 of compensation circuit 38a can be rewritten.

In the second embodiment, by providing impedance setter 39, impedance Zx can be set or adjusted on site for example when uninterruptible power supply device 100 is installed. It should be noted that, since the cable length in an uninterruptible power supply device changes depending on the installation location of the device, it is difficult to appropriately preset a compensation command value at the time of shipment. That is, impedance setter 39 allows a user to easily set an appropriate compensation command value.

As described above, according to the second embodiment of the present invention, the same function and effect as those in the first embodiment can be obtained, and in addition, the compensation command value for the three-phase AC line can be adjusted more easily.

Third Embodiment

In a third embodiment, a voltage sensor 42 configured to detect a voltage Vl applied to each phase of AC load 2 is further provided. Then, a compensation circuit 38b generates a compensation command value in each phase based on a difference between of three-phase reference value Vr and Vl detected by voltage sensor 42.

Figure 7:
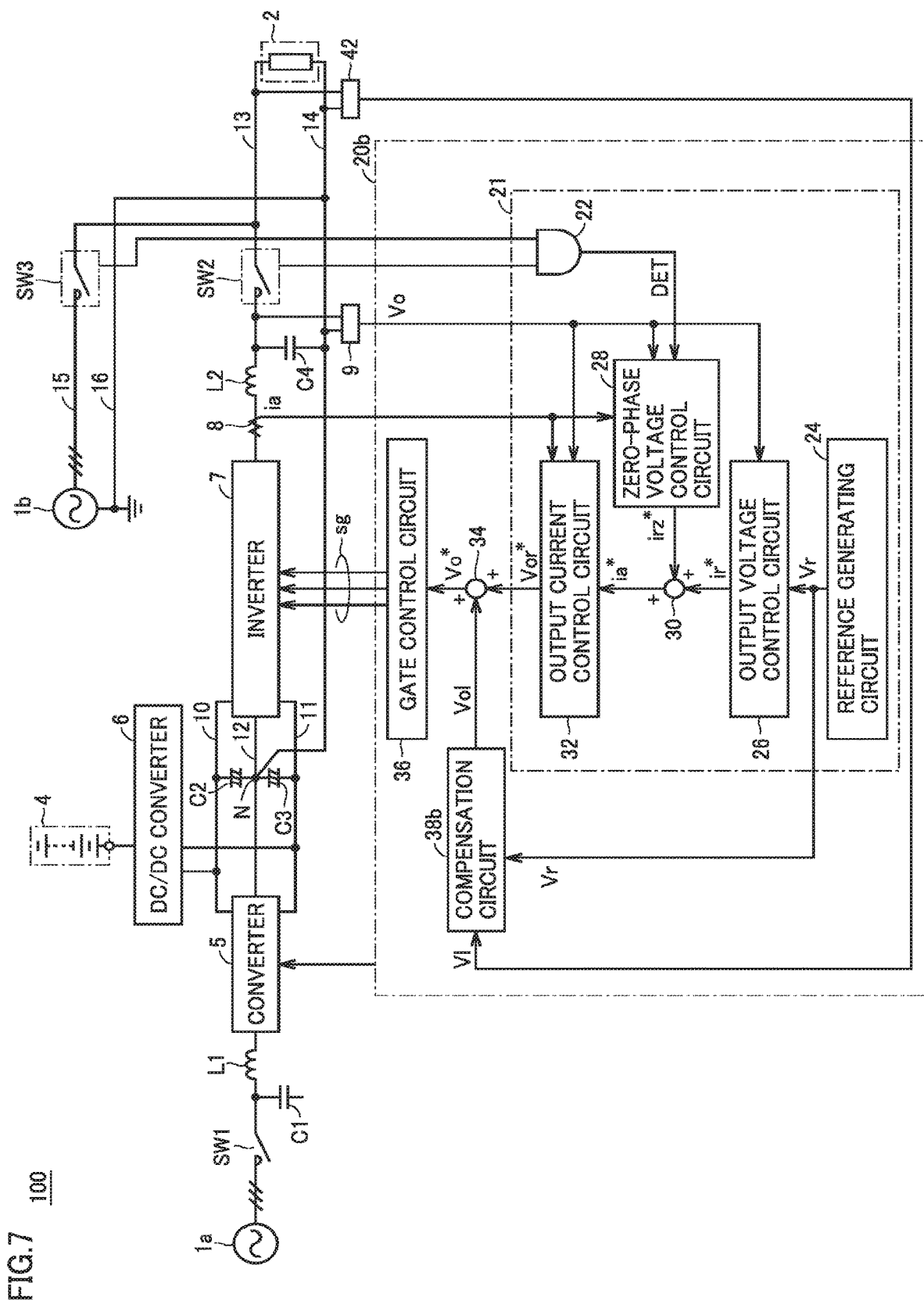
FIG. 7 is a schematic block diagram showing a main circuit configuration of an uninterruptible power supply device in accordance with a third embodiment of the present invention.

FIG. 7 is a schematic block diagram showing a main circuit configuration of uninterruptible power supply device 100 in accordance with the third embodiment of the present invention, and is a diagram to be compared with FIG. 1. Referring to FIG. 7, uninterruptible power supply device 100 in accordance with the third embodiment is different from uninterruptible power supply device 100 in FIG. 1 in that voltage sensor 42 and compensation circuit 38b are added instead of compensation circuit 38a. Voltage sensor 42 detects voltage Vl applied to AC load 2.

Figure 8:
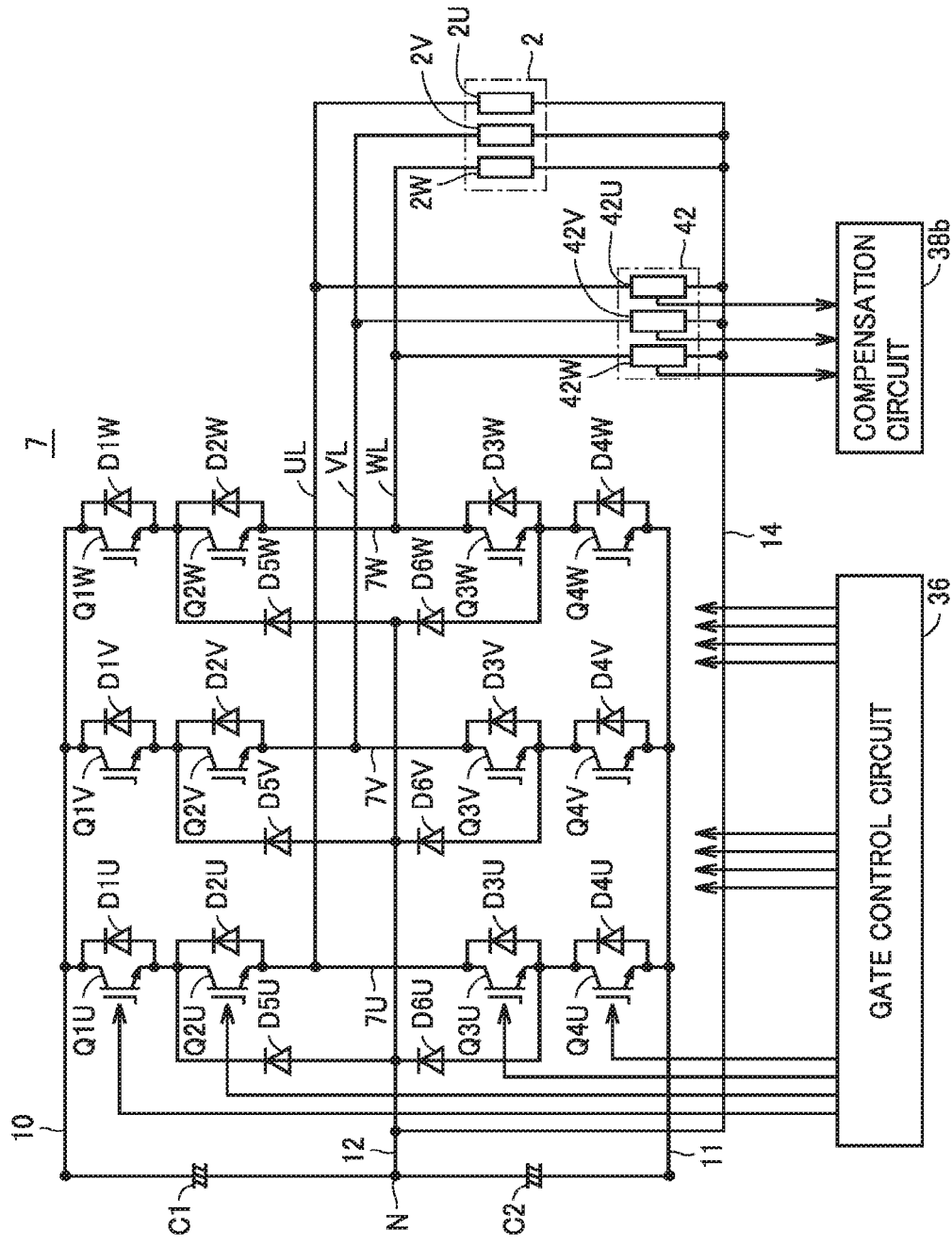
FIG. 8 is a circuit diagram illustrating configurations of an inverter and an AC load shown in FIG. 7 in detail.

FIG. 8 is a circuit diagram illustrating configurations of inverter 7 and AC load 2 shown in FIG. 7 in detail, and is a diagram to be compared with FIG. 2.

Referring to FIG. 8, voltage sensor 42 includes voltage sensors 42U, 42V, and 42W. In the following, letters U, V, and W will be collectively indicated by a letter "x" to collectively describe compensation of voltage drops in the respective phase lines. Voltage sensor 42x detects a voltage Vlx at an end portion closer to single-phase load 2x of each phase line xL (an x-phase load end voltage). Load end voltage Vlx detected by voltage sensor 42x is input into compensation circuit 38b.

Figure 9:
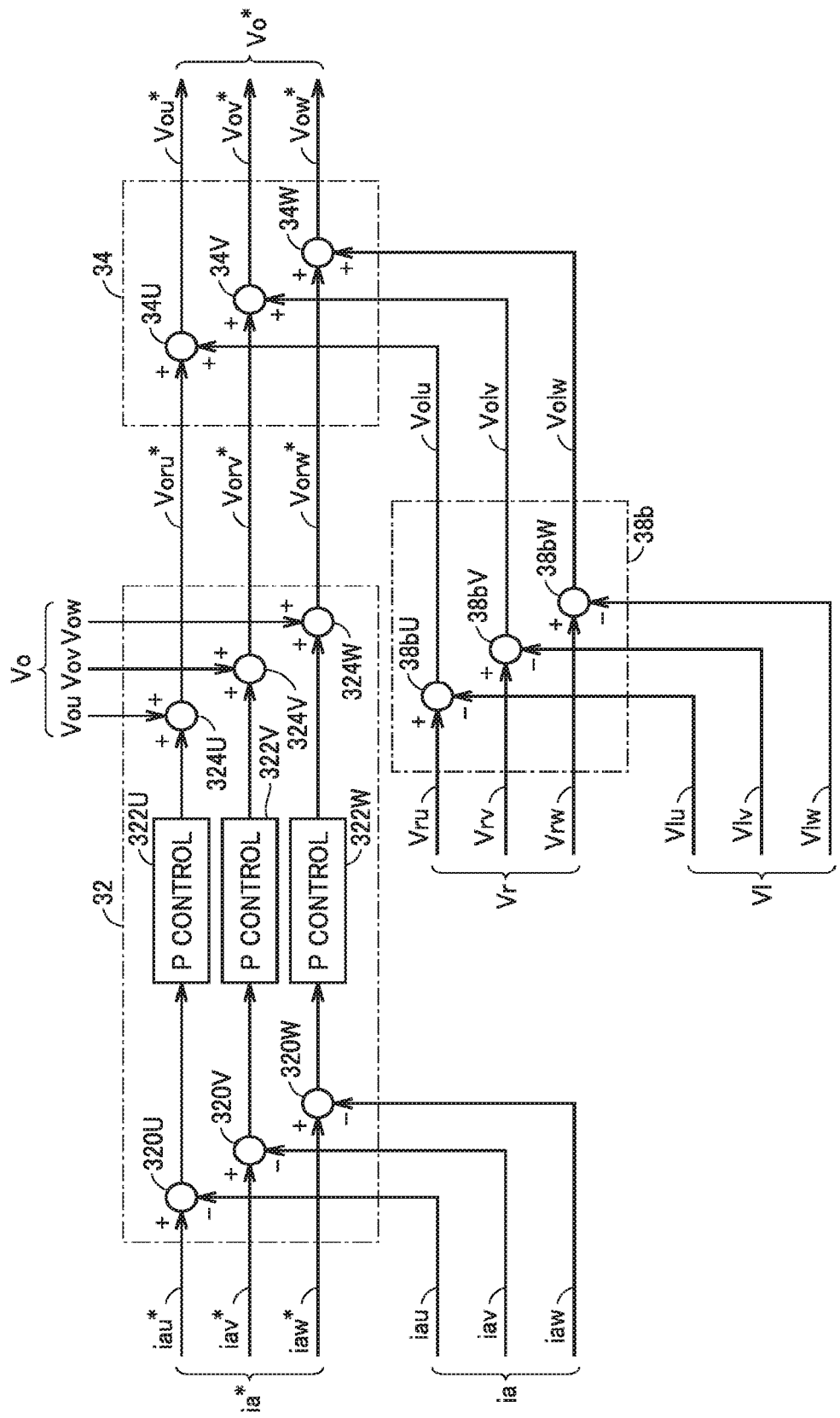
FIG. 9 is a functional block diagram of an output current control circuit, an adder, and a compensation circuit shown in FIG. 7.

FIG. 9 is a functional block diagram of output current control circuit 32, compensation circuit 38b, and adder 34 shown in FIG. 7, and is a diagram to be compared with FIG. 4.

Referring to FIG. 9, compensation circuit 38b is different from compensation circuit 38a in FIG. 4 in that three-phase reference value Vr (U-phase reference value Vru, V-phase reference value Vrv, W-phase reference value Vrw) generated by reference generating circuit 24 (FIG. 7) and load end voltage Vl (a U-phase load end voltage Vlu, a V-phase load end voltage Vlv, a W-phase load end voltage Vlw) detected by voltage sensor 42 (FIG. 7) are input thereto, instead of detected value is of current sensor 8.

Compensation circuit 38b includes subtracters 38bU, 38bV, and 38bW. In the following, letters U, V, and W will be collectively indicated by a letter "x" to collectively describe compensation of voltage drops in the respective phase lines.

Subtracter 38bx calculates voltage difference Volx between x-phase reference value Vrx and x-phase load end voltage Vlx. Subtracter 38bx outputs calculated voltage difference Volx to adder 34x.

Adder 34x corrects output voltage command value Vorx* from adder 324x based on compensation command value Volx from compensation circuit 38b. Adder 34x in the third embodiment corrects output voltage command value Vorx* by adding compensation command value Volx from compensation circuit 38b to output voltage command value Vorx* from adder 324x. Corrected output voltage command value Vox* is output to gate control circuit 36, and is reflected in the output voltage of inverter 7.

Thereby, the three-phase voltage for which voltage drops in the respective lines of three-phase AC line 13 have been compensated for is output from inverter 7. Each of AC voltages to be supplied to single-phase loads 2U, 2V, and 2W via three-phase AC line 13 has a magnitude equal to that of three-phase reference value Vr of reference generating circuit 24.

As described above, according to the third embodiment of the present invention, the same function and effect as those in the first embodiment can be obtained. In addition, in the third embodiment, the detected value of load end voltage Vl of each line of three-phase AC line 13 is used to calculate a voltage drop amount in each line, and compensation command value Vol is generated from the calculated voltage drop amount. With this configuration, the voltage drop amount in each line can be grasped more accurately, when compared with the configuration in which the voltage drop amount is calculated based on three-phase current ia and impedance Zx of each line described in the first and second embodiments. As a result, voltage drops can be compensated for with higher accuracy.

It should be understood that the embodiments disclosed herein are illustrative and non-restrictive in every respect. The scope of the present invention is defined by the scope of the claims, rather than the description of the embodiments described above, and is intended to include any modifications within the scope and meaning equivalent to the scope of the claims.

REFERENCE SIGNS LIST

1a: AC power supply; 1b: bypass AC power supply; 2: AC load; 2U, 2V, 2W: single-phase load; 4: storage battery; 5: converter; 6: DC/DC converter; 7: inverter; 8: current sensor; 9: voltage sensor; 10: DC positive bus; 11: DC negative bus; 12: DC neutral point bus; 13, 15: three-phase AC line; 14: neutral phase line; 16: ground line; 20a: controller; 21: generation circuit; 22: OR circuit; 24: reference generating circuit; 26: output voltage control circuit; 28: zero-phase voltage control circuit; 30, 34, 34U, 34V, 34W, 288, 292, 324U, 324V, 324W: adder; 32: output current control circuit; 36: gate control circuit; 38a, 38b: compensation circuit; 39: impedance setter; 100: uninterruptible power supply device; 280: zero voltage generator; 282: switching circuit; 284, 320U, 320V, 320W: subtracter; 286: PI control circuit; 290, 294, 296, 382aU, 382aV, 382aW, 382bU, 382bV, 382bW: multiplier; 322U, 322V, 322W: P control circuit; 298: limiter; 384: memory; SW1 to SW3: switch; L1, L2: reactor; C1 to C4: capacitor; UL: U-phase line; VL: V-phase line; WL: W-phase line; Q1U to Q4U, Q1V to Q4V, Q1W to Q4W: IGBT element; D1U to D6U, D1V to D6V, D1W to D6W: diode.

The invention claimed is:

1. An uninterruptible power supply device comprising:
a smoothing circuit including two capacitors connected in series between a DC positive bus and a DC negative bus;
an inverter connected to a DC terminal and a neutral point of the smoothing circuit, and configured to convert DC power from the smoothing circuit into three-phase AC power;
a three-phase AC line connecting the inverter and an AC load;
a neutral phase line connecting the neutral point and a neutral point of the AC load;
a current sensor configured to detect an output current of each phase of the inverter;
a first voltage sensor configured to detect an output voltage of each phase of the inverter; and
a controller configured to control power conversion operation of the inverter,
the controller including
a generation circuit configured to generate an output voltage command value for the inverter based on a three-phase reference value which is a target value of the output voltage of each phase of the inverter, a zero-phase reference value which is a target value of a zero-phase voltage of the inverter, a detected value of the current sensor, and a detected value of the first voltage sensor,
a compensation circuit configured to generate a compensation command value for compensating for a voltage drop in the three-phase AC line when the three-phase AC power is supplied from the inverter to the AC load,
a corrector configured to correct the output voltage command value based on the compensation command value, and
a control circuit configured to control the inverter based on the output voltage command value corrected by the corrector.

2. The uninterruptible power supply device according to claim 1, wherein the compensation circuit includes a memory for storing an impedance of the three-phase AC line, and is configured to generate the compensation command value based on the impedance of the three-phase AC line stored in the memory and the detected value of the current sensor.

3. The uninterruptible power supply device according to claim 2, further comprising a setter configured to set the impedance of the three-phase AC line to be stored in the memory based on an external input.

4. The uninterruptible power supply device according to claim 3, further comprising:
a converter connected to an external three-phase AC power supply, and configured to convert three-phase AC power from the three-phase AC power supply into DC power and output the DC power to the DC positive bus and the DC negative bus; and
a power storage device configured to be charged by receiving the DC power from the converter or from the DC positive bus and the DC negative bus.

5. The uninterruptible power supply device according to claim 4, wherein
the generation circuit includes
an output voltage control circuit configured to generate a three-phase current command value based on a deviation between the three-phase reference value and the detected value of the first voltage sensor,
a zero-phase voltage control circuit configured to generate a zero-phase current command value based on a deviation between the zero-phase reference value and the zero-phase voltage extracted from the detected value of the first voltage sensor, and
an output current control circuit configured to generate an output current command value for the inverter by adding the zero-phase current command value to the three-phase current command value, and generate the output voltage command value based on a deviation between the output current command value and the detected value of the current sensor, and
the corrector is configured to correct the output voltage command value by adding the compensation command value to the output voltage command value.

6. The uninterruptible power supply device according to claim 3, wherein
the generation circuit includes
an output voltage control circuit configured to generate a three-phase current command value based on a deviation between the three-phase reference value and the detected value of the first voltage sensor,
a zero-phase voltage control circuit configured to generate a zero-phase current command value based on a deviation between the zero-phase reference value and the zero-phase voltage extracted from the detected value of the first voltage sensor, and
an output current control circuit configured to generate an output current command value for the inverter by adding the zero-phase current command value to the three-phase current command value, and generate the output voltage command value based on a deviation between the output current command value and the detected value of the current sensor, and
the corrector is configured to correct the output voltage command value by adding the compensation command value to the output voltage command value.

7. The uninterruptible power supply device according to claim 2, further comprising:
a converter connected to an external three-phase AC power supply, and configured to convert three-phase AC power from the three-phase AC power supply into DC power and output the DC power to the DC positive bus and the DC negative bus; and a power storage device configured to be charged by receiving the DC power from the converter or from the DC positive bus and the DC negative bus.

8. The uninterruptible power supply device according to claim 7, wherein the generation circuit includes
an output voltage control circuit configured to generate a three-phase current command value based on a deviation between the three-phase reference value and the detected value of the first voltage sensor,
a zero-phase voltage control circuit configured to generate a zero-phase current command value based on a deviation between the zero-phase reference value and the zero-phase voltage extracted from the detected value of the first voltage sensor, and
an output current control circuit configured to generate an output current command value for the inverter by adding the zero-phase current command value to the three-phase current command value, and generate the output voltage command value based on a deviation between the output current command value and the detected value of the current sensor, and the corrector is configured to correct the output voltage command value by adding the compensation command value to the output voltage command value.

9. The uninterruptible power supply device according to claim 2, wherein the generation circuit includes
an output voltage control circuit configured to generate a three-phase current command value based on a deviation between the three-phase reference value and the detected value of the first voltage sensor,
a zero-phase voltage control circuit configured to generate a zero-phase current command value based on a deviation between the zero-phase reference value and the zero-phase voltage extracted from the detected value of the first voltage sensor, and
an output current control circuit configured to generate an output current command value for the inverter by adding the zero-phase current command value to the three-phase current command value, and generate the output voltage command value based on a deviation between the output current command value and the detected value of the current sensor, and the corrector is configured to correct the output voltage command value by adding the compensation command value to the output voltage command value.

10. The uninterruptible power supply device according to claim 1, further comprising a second voltage sensor configured to detect a voltage applied to each phase of the AC load, wherein the compensation circuit is configured to generate the compensation command value based on a difference between the three-phase reference value and a detected value of the second voltage sensor.

11. The uninterruptible power supply device according to claim 10, further comprising:

a converter connected to an external three-phase AC power supply, and configured to convert three-phase AC power from the three-phase AC power supply into DC power and output the DC power to the DC positive bus and the DC negative bus; and a power storage device configured to be charged by receiving the DC power from the converter or from the DC positive bus and the DC negative bus.

12. The uninterruptible power supply device according to claim 11, wherein the generation circuit includes
an output voltage control circuit configured to generate a three-phase current command value based on a deviation between the three-phase reference value and the detected value of the first voltage sensor,
a zero-phase voltage control circuit configured to generate a zero-phase current command value based on a deviation between the zero-phase reference value and the zero-phase voltage extracted from the detected value of the first voltage sensor, and
an output current control circuit configured to generate an output current command value for the inverter by adding the zero-phase current command value to the three-phase current command value, and generate the output voltage command value based on a deviation between the output current command value and the detected value of the current sensor, and the corrector is configured to correct the output voltage command value by adding the compensation command value to the output voltage command value.

13. The uninterruptible power supply device according to claim 10, wherein the generation circuit includes
an output voltage control circuit configured to generate a three-phase current command value based on a deviation between the three-phase reference value and the detected value of the first voltage sensor,
a zero-phase voltage control circuit configured to generate a zero-phase current command value based on a deviation between the zero-phase reference value and the zero-phase voltage extracted from the detected value of the first voltage sensor, and
an output current control circuit configured to generate an output current command value for the inverter by adding the zero-phase current command value to the three-phase current command value, and generate the output voltage command value based on a deviation between the output current command value and the detected value of the current sensor, and the corrector is configured to correct the output voltage command value by adding the compensation command value to the output voltage command value.

14. The uninterruptible power supply device according to claim 1, further comprising:

a converter connected to an external three-phase AC power supply, and configured to convert three-phase AC power from the three-phase AC power supply into DC power and output the DC power to the DC positive bus and the DC negative bus; and a power storage device configured to be charged by receiving the DC power from the converter or from the DC positive bus and the DC negative bus.

15. The uninterruptible power supply device according to claim 14, wherein the generation circuit includes
an output voltage control circuit configured to generate a three-phase current command value based on a deviation between the three-phase reference value and the detected value of the first voltage sensor,
a zero-phase voltage control circuit configured to generate a zero-phase current command value based on a deviation between the zero-phase reference value and the zero-phase voltage extracted from the detected value of the first voltage sensor, and an output current control circuit configured to generate an output current command value for the inverter by adding the zero-phase current command value to the three-phase current command value, and generate the output voltage command value based on a deviation between the output current command value and the detected value of the current sensor, and the corrector is configured to correct the output voltage command value by adding the compensation command value to the output voltage command value.

16. The uninterruptible power supply device according to claim 1, wherein the generation circuit includes an output voltage control circuit configured to generate a three-phase current command value based on a deviation between the three-phase reference value and the detected value of the first voltage sensor, a zero-phase voltage control circuit configured to generate a zero-phase current command value based on a deviation between the zero-phase reference value and the zero-phase voltage extracted from the detected value of the first voltage sensor, and an output current control circuit configured to generate an output current command value for the inverter by adding the zero-phase current command value to the three-phase current command value, and generate the output voltage command value based on a deviation between the output current command value and the detected value of the current sensor, and the corrector is configured to correct the output voltage command value by adding the compensation command value to the output voltage command value.

* * * * *